(12) United States Patent
Joshi et al.

(10) Patent No.: US 10,829,236 B2
(45) Date of Patent: Nov. 10, 2020

(54) INCLEMENT WEATHER DETECTION IN AIRCRAFT

(71) Applicant: PRATT & WHITNEY CANADA CORP., Longueuil (CA)

(72) Inventors: Ninad Joshi, Brampton (CA); Yen-Wen Wang, Boucherville (CA); Tony Yee, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 95 days.

(21) Appl. No.: 16/015,621

(22) Filed: Jun. 22, 2018

(65) Prior Publication Data

US 2019/0389591 A1    Dec. 26, 2019

(51) Int. Cl.
| | | |
|---|---|---|
| *B64D 31/06* | (2006.01) | |
| *F02C 9/26* | (2006.01) | |
| *F02C 9/22* | (2006.01) | |
| *F02C 9/18* | (2006.01) | |
| *G01S 13/89* | (2006.01) | |
| *G06K 9/00* | (2006.01) | |
| *G06N 20/00* | (2019.01) | |

(52) U.S. Cl.
CPC ............. *B64D 31/06* (2013.01); *F02C 9/18* (2013.01); *F02C 9/22* (2013.01); *F02C 9/26* (2013.01); *G01S 13/89* (2013.01); *G06K 9/0063* (2013.01); *F05D 2220/323* (2013.01); *F05D 2270/096* (2013.01); *F05D 2270/11* (2013.01); *F05D 2270/311* (2013.01); *F05D 2270/709* (2013.01); *F05D 2270/805* (2013.01); *F05D 2270/8041* (2013.01); *G06N 20/00* (2019.01)

(58) Field of Classification Search
CPC . B64D 31/06; G01S 13/89; F02C 9/22; F02C 9/18; F02C 9/26; F02C 2270/096; F02C 2270/709; F02C 2220/323; F02C 2270/805; F02C 2270/11; F02C 2270/8041; F02C 2270/311; G06K 9/0063; G06N 20/00
See application file for complete search history.

(56) References Cited

U.S. PATENT DOCUMENTS

| | | | |
|---|---|---|---|
| 9,542,600 B2 | 1/2017 | Buchanan et al. | |
| 2011/0013016 A1* | 1/2011 | Tillotson | G01N 21/41 348/135 |
| 2017/0372120 A1 | 12/2017 | Revell et al. | |
| 2018/0079520 A1* | 3/2018 | Joshi | B64D 27/00 |

* cited by examiner

*Primary Examiner* — Anne Marie Antonucci
(74) *Attorney, Agent, or Firm* — Norton Rose Fulbright Canada LLP (57) ABSTRACT

Herein provided are systems and methods for operating an aircraft engine during inclement weather. At least one image of a location substantially in line with a heading of the aircraft is acquired. Based on the at least one image, an inclement weather condition in the location is detected. An alert mode of the engine is triggered upon detecting the inclement weather condition. Responsive to the alert mode being triggered, at least one predetermined performance parameter of the engine is monitored. Upon detecting a change in the at least one predetermined performance parameter beyond a predetermined threshold, at least one operating condition of the engine is altered.

14 Claims, 5 Drawing Sheets

INCLEMENT WEATHER DETECTION IN AIRCRAFT

TECHNICAL FIELD

The application relates generally to aircraft engines, and more particularly to techniques for operating aircraft engines in inclement weather.

BACKGROUND OF THE ART

An engine flameout refers to unintended shutdown of an engine due to the extinction of flames in the combustion chamber. In some cases, inclement weather conditions may be responsible for an engine flameout, for example due to ingested ice or water during a rain storm and/or a hail storm. For this reason, there are various techniques used to avoid engine flameout.

Many efforts focus on the coping strategies to deal with inclement weather, which may include increasing fuel flow, altering inlet-guide-vanes, adjusting bleed extraction, or a combination thereof. However, the need to properly detect inclement weather, and particularly performing early detection, has largely been overlooked. Without accurate detection for the existence of inclement weather conditions, engine control systems can engage inclement weather countermeasures only after exposure to the inclement weather. In some cases, these reactive approaches do not provide enough time to allow the engine to respond adequately to prevent flameout events.

As such, there is room for improvement.

SUMMARY

In accordance with a broad aspect of the invention, there is provided a system for operating an engine of an aircraft in inclement weather, the system comprising: an image-acquisition device affixed to the aircraft having a line-of-sight substantially aligned with a heading of the aircraft, the image-acquisition device configured for acquiring at least one image of a location aligned with the heading; an image analysis module communicatively coupled to the image-acquisition device and configured for: detecting, based on the at least one image, an inclement weather condition in the location; and triggering an alert mode of the engine upon detecting the inclement weather condition; and an engine controller communicatively coupled to the image analysis module and to the engine, the engine controller configured for: responsive to the alert mode being triggered, monitoring at least one predetermined performance parameter of the engine; and upon detecting a change in the at least one predetermined performance parameter beyond a predetermined threshold, altering at least one operating condition of the engine.

In some embodiments, the image analysis module is further configured for releasing the alert mode when no change in the at least one predetermined performance parameter of the engine is detected for a predetermined time period.

In some embodiments, detecting the inclement weather condition comprises detecting the presence of a cloud in the location.

In some embodiments, detecting the inclement weather condition comprises detecting the presence of moisture in the location.

In some embodiments, the inclement weather condition is detected using a machine learning algorithm.

In some embodiments, detecting the change in the at least one predetermined performance parameter beyond the predetermined threshold comprises detecting a drop in an operating temperature of the engine below a predetermined temperature threshold.

In some embodiments, the image-acquisition device is an infrared camera.

In some embodiments, the image-acquisition device is a visible-light camera.

In some embodiments, the image-acquisition device is a radar system.

In some embodiments, the image-acquisition device is configured for acquiring the at least one image of the location ahead of the engine.

In accordance with another broad aspect, there is provided a method for operating an aircraft engine during inclement weather, comprising: acquiring at least one image of a location substantially in line with a heading of the aircraft; detecting, based on the at least one image, an inclement weather condition in the location; triggering an alert mode of the engine upon detecting the inclement weather condition; responsive to the alert mode being triggered, monitoring at least one predetermined performance parameter of the engine; and upon detecting a change in the at least one predetermined performance parameter beyond a predetermined threshold, altering at least one operating condition of the engine.

In some embodiments, the method further comprises releasing the alert mode when no change in the at least one predetermined performance parameter of the engine is detected for a predetermined time period.

In some embodiments, detecting the inclement weather condition comprises detecting the presence of a cloud in the location.

In some embodiments, detecting the inclement weather condition comprises detecting the presence of moisture in the location.

In some embodiments, the inclement weather condition is detected using a machine learning algorithm.

In some embodiments, detecting the change in the at least one predetermined performance parameter beyond the predetermined threshold comprises detecting a drop in an operating temperature of the engine below a predetermined temperature threshold.

In some embodiments, the at least one image is acquired with an infrared camera.

In some embodiments, the at least one image is acquired with a visible-light camera.

In some embodiments, the at least one image is acquired with a radar system.

In some embodiments, acquiring at least one image of the location substantially in line with the heading of the aircraft comprises acquiring the at least one image of the location ahead of the engine.

DESCRIPTION OF THE DRAWINGS

Reference is now made to the accompanying figures in which.

DETAILED DESCRIPTION

There is described herein methods and systems for operating an engine of an aircraft in inclement weather. Inclement weather refers to any weather condition which may have an adverse effect on the operation of the engine, including engine flameout. Examples of inclement weather include, but are not limited to, rain, hail, ice, sleet, snow, freezing rain, and/or a combination thereof. Inclement weather also includes atmospheric conditions in the vicinity of the engine having adverse effects on the operation of the engine, including operation in high-moisture environments, for example in a cloud.

Figure 1:
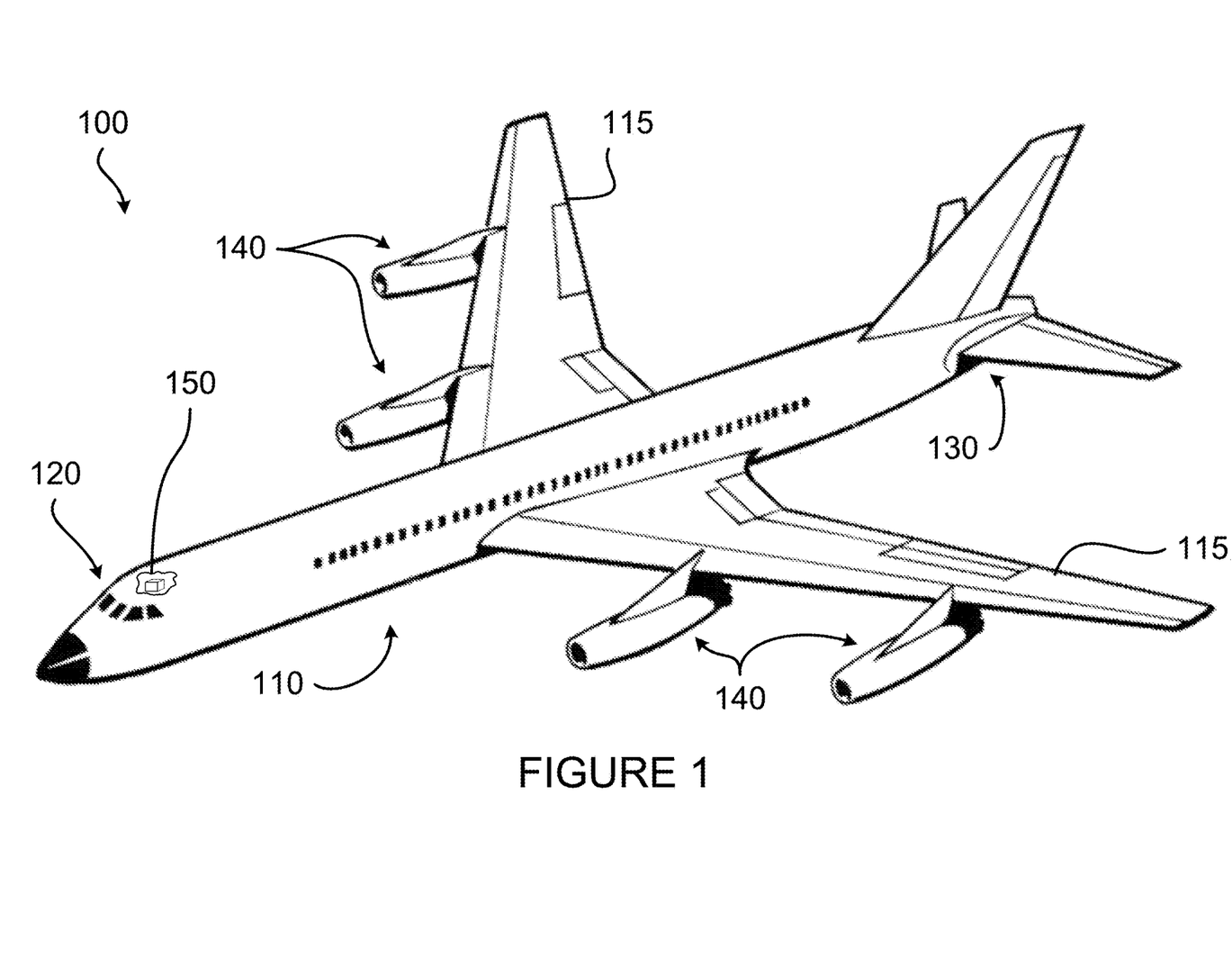
FIG. 1 is a schematic perspective view of an example aircraft.

With reference to FIG. 1, there is illustrated an example aircraft 100 having a fuselage 110 and wings 115. The fuselage 110 includes a cockpit 120 and a tailcone 130, which can be substantially integral to the fuselage 110. The aircraft 100 also includes engines 140 which can be affixed to the wings 115 and/or to the fuselage 110. As used herein, the term "engine" is to be understood as including the engines themselves and the nacelles which contain the engines. Although shown in FIG. 1 generally as a turbofan aircraft in which the engines 140 are gas turbine engines, it should be noted that the aircraft 100 can be any suitable type of aircraft having any suitable number of engines of any suitable type.

Control of the operation of the engines 140 can be effected by one or more control systems, for example one or more engine control systems. In some embodiments, a single engine control system is configured for controlling operation of all the engines 140. In other embodiments, each of the engines 140 is provided with a respective engine control system. In still further embodiments, the aircraft 100 has a plurality of engine control systems, each of which controls one or more of the engines 140. Still other configurations of engine control systems are considered. For example, the aircraft 100 has a central engine governing system (not illustrated) which in turn controls one or more engine control systems, each of which modulates the operation of one or more of the engines 140. In addition, while the engines 140 are shown as being primary thrust gas turbine engines of the aircraft 100, it should be noted that the embodiments described herein can apply to any suitable gas turbine engine of the aircraft 100, including auxiliary engines, or to any engine of any suitable vehicle, generator, and the like. In another example, dual-channel engines controllers can be used, in which separate channels are used for data acquisition and data transmission.

As part of the control of the engines 140, engine control system(s) can determine the presence of inclement weather conditions in the vicinity of the engines 140. In accordance with embodiments of the present disclosure, one or more image-acquisition devices (IADs) 150 are affixed to the aircraft 100, or otherwise provided therewith, for acquiring images of locations aligned with a heading of the aircraft 100. Put differently, the IADs 150 capture images of locations which are along the flight path of the aircraft and which the aircraft is susceptible to pass through in the future. The IADs 150 can be affixed to or provided within the fuselage 110, the wings 115, and/or the engines 140 themselves. For example, one or more IADs 150 can be included in a nacelle of some or all of the engines 140, in connection portion between the wings 115 and the engines 140 or the nacelles thereof, and the like.

In some embodiments, each of the engines 140 can be provided with a respective IAD 150. The IADs 150 are positioned so that the line-of-sight of the IADs 150 is substantially aligned with the flight path of the aircraft 100. In some embodiments, IADs 150 located in the engines 140 can acquire images of locations ahead of the engines 140 themselves.

In some embodiments, the IADs 150 are cameras or camera sensors which capture visible-light information. For example, cameras which capture light in the range of approximately 390 nm to 700 nm can be used. In some other embodiments, the IADs 150 are cameras or camera sensors which capture information in the infrared and/or the ultraviolet range. In still other embodiments, the IADs 150 implement sonar- and/or radar-based imaging techniques. For example, the aircraft 100 includes one or more radar devices which can be used to detect clouds.

Figure 2:
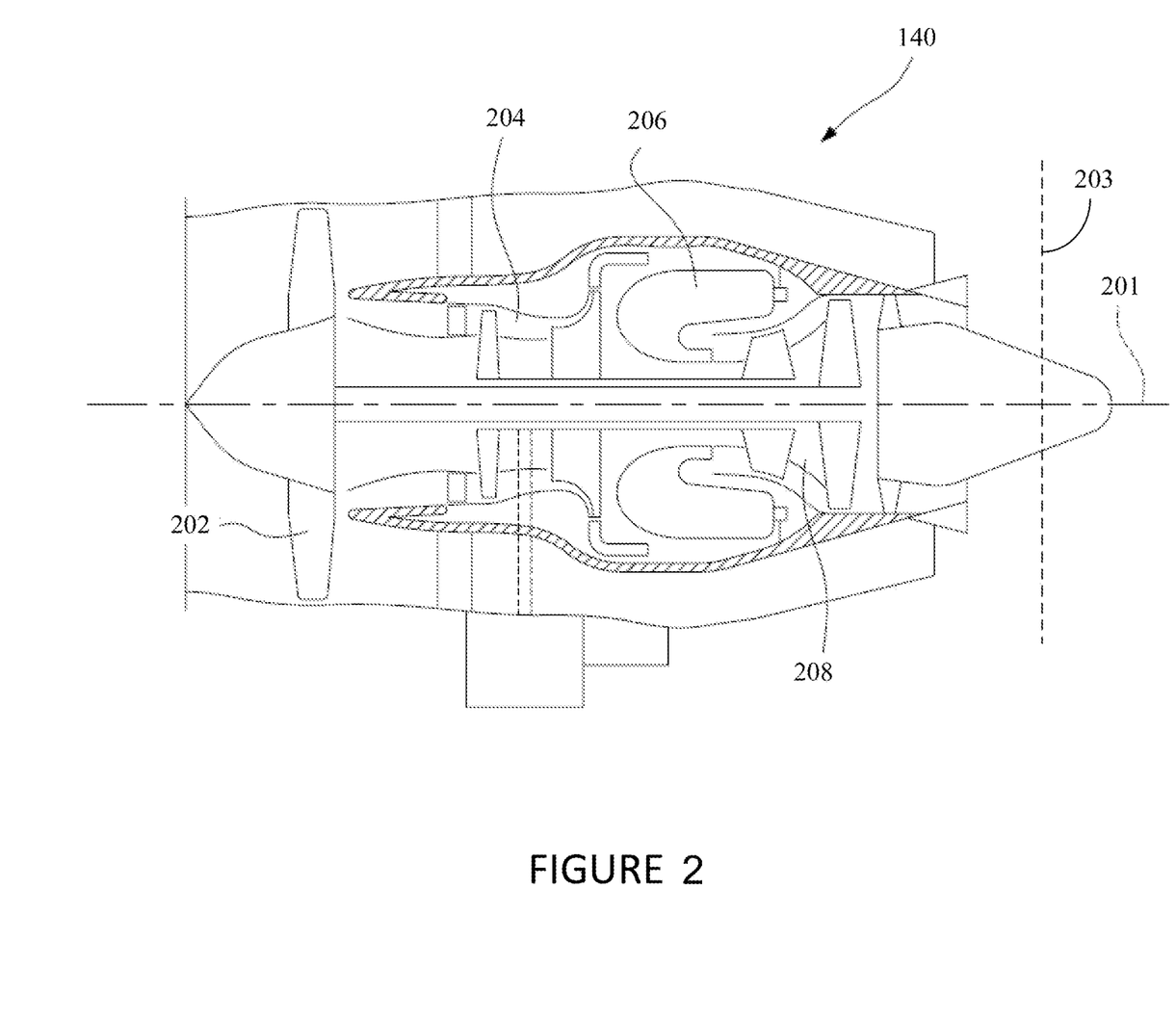
FIG. 2 is a schematic cross-sectional view of a gas turbine engine of the aircraft of FIG. 1, in accordance with one embodiment.

With reference to FIG. 2, an example of the gas turbine engine 140 is illustrated. It should be noted that although engine 140 is a turbofan engine, the methods and systems described herein may be applicable to turboprop, turboshaft, and other types of aviation engines, including piston engines, Wankel engines, and the like, as well as to other types of engines, including other types of gas turbine engines.

Engine 140 generally comprises in serial flow communication: a fan 202 through which ambient air is propelled, a compressor section 204 for pressurizing the air, a combustor 206 in which the compressed air is mixed with fuel and ignited for generating an annular stream of hot combustion gases, and a turbine section 208 for extracting energy from the combustion gases. Axis 201 defines an axial direction of the engine 140, and axis 203 defines a radial direction of the engine 140. In some embodiments, a low pressure spool is composed of a low pressure shaft and a low pressure turbine. The low pressure shaft drives the propeller 202. A high pressure spool is composed of a high pressure turbine attached to a high-pressure shaft, which is connected to the compressor section 204.

Figure 3:
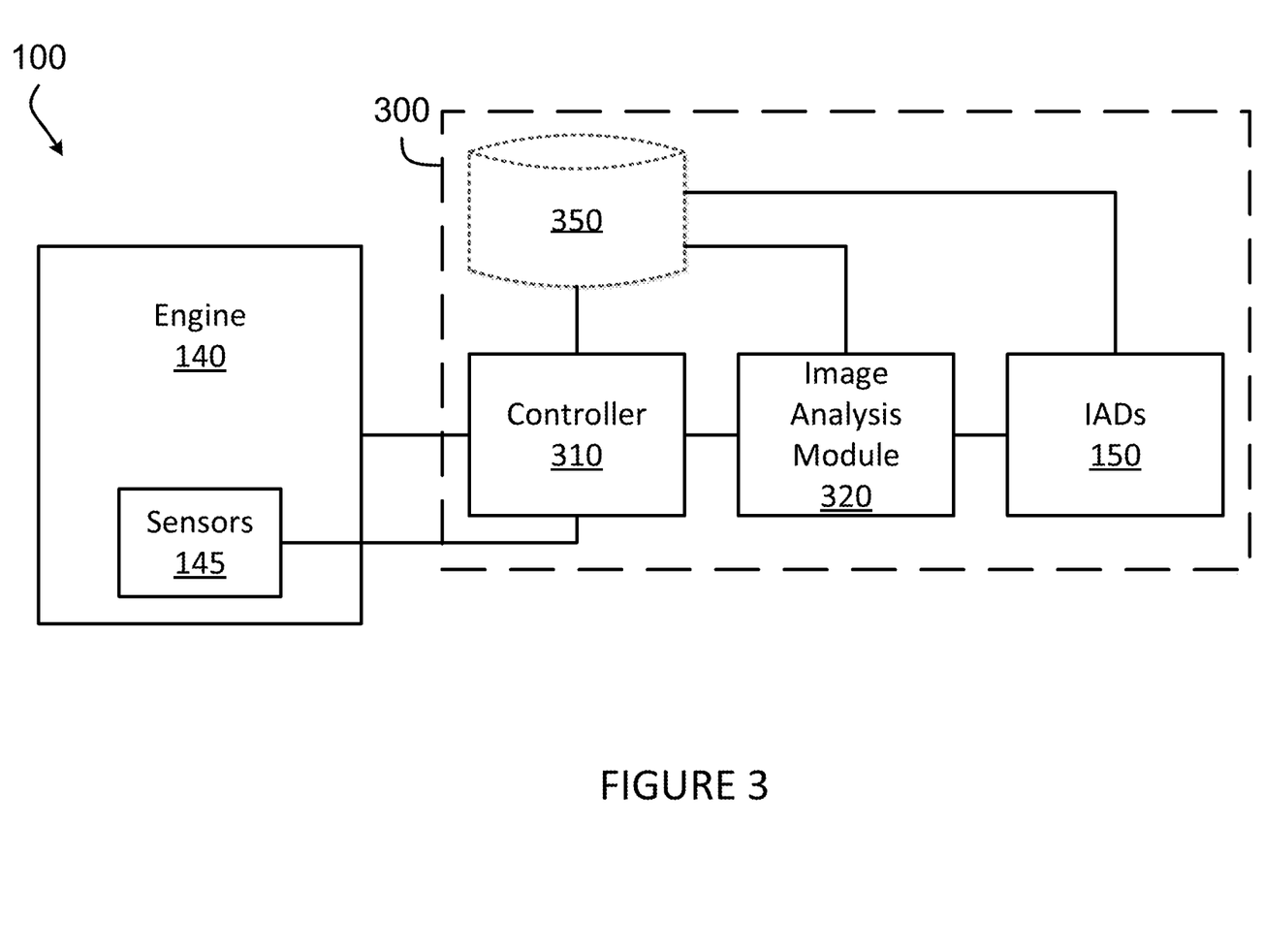
FIG. 3 is a block diagram of an example system for operating an engine of an aircraft in inclement weather.

With reference to FIG. 3, there is illustrated an example embodiment of an engine control system 300. The engine control system 300 comprises the IADs 150, a controller 310, an image analysis module 320, and optionally a database 350, or other suitable data storage device. The engine control system 300 is configured for interfacing with the engine 140, for example via the controller 310, and is communicatively coupled with sensors 145 integrated in or otherwise associated with the engine 140. The sensors 145 can include temperature sensors, pressure sensors, humidity or moisture sensors, or any other sensors suitable for providing information regarding the performance parameters of the engine 140. In some embodiments, the sensors 145 are physically co-located with or in the engine 140. In other embodiments, the sensors 145 include one or more virtual sensors which derive values for the performance parameters based on other information.

Within the engine control system 300, the IADs 150 are configured for acquiring images of various locations within the flight path of the aircraft 100. The IADs 150 can acquire images of a plurality of locations at substantially the same time, or can sequentially acquire images of various locations within the flight path of the aircraft 100. In embodiments in which the engine control system 300 includes multiple IADs 150, the IADs 150 can be controlled to acquire images of different locations within the flight path of the aircraft 100 which together form a broader image of the general area into which the aircraft 100 is headed. For example, the IADs 150 can acquire a plurality of images which can be stitched together using image processing techniques.

The image analysis module 320 is configured for performing image processing on the images acquired by the IADs 150. The image analysis module 3230 can acquire the images from the IADs 150 and/or from the database 350, as appropriate. The image processing performed by the image analysis module 320 can include stitching together images acquired by the IADs 150, for instance. In another example, the image analysis module 320 is configured for processing the images to detect inclement weather conditions in the flight path of the aircraft 100.

In one example, the image analysis module 320 is configured for processing the images to detect the presence of clouds in the flight path of the aircraft 100. Techniques such as edge detection, gradient matching, primal sketch, and the like, can be used to detect the presence of clouds in the flight path of the aircraft. In some instances, the image processing can further identify the relative position of the clouds to the aircraft 100, a distance between the clouds and the aircraft 100, the shape, size, and density of the clouds, and other relevant information.

For instance, the image processing operations can include an iterative approach to determining a distance to a cloud or other inclement weather condition. A first image including the cloud can be analyzed to determine a first estimated distance, and then further images can be used to refine the estimate, based on changes in the apparent distance of the cloud along three Cartesian axes, in the angle of the cloud relative to the aircraft, and the like. The distance can be expressed as a measure of linear separation (e.g. in kilometers), or as a time-to-reach based on a current speed of the aircraft. Still other embodiments are considered.

In another example, the image analysis module 320 is configured for processing the images to detect the presence of moisture and/or high humidity levels in the flight path of the aircraft 100. For example, the IADs 150 can include one or more infrared cameras which can be used by image analysis module 320 to estimate or measure moisture levels of various locations within the flight path of the aircraft 100.

For example, in embodiments in which the IADs 150 incorporate the image analysis module 320 and are configured for performing the image processing on the images acquired by the IADs 150, the IADs 150 can transmit to the controller 310 some indication regarding the detection of inclement weather conditions in the flight path of the aircraft. The indications provided to the controller 310 can include a position of the inclement weather condition, a distance until the inclement weather condition is reached, a time-to-reach the inclement weather condition, a scale, size, shape, etc., of the inclement weather condition, and the like. In other embodiments, the IADs 150 only acquire the images, and then provide the images to the controller 310, which incorporates the image analysis module 320, without performing any processing. The controller 310 can then perform one or more image processing operations to detect inclement weather conditions in the flight path of the aircraft. Additionally, in some embodiments, the IADs 150 are configured for storing the images, the processed images, data resulting from the image processing, or any other relevant information in the database 350.

The database 350 can be configured for storing data provided by the IADs 150, the image analysis module 320, and by the controller 310, as discussed in greater detail hereinbelow. The database 350 can be any suitable data storage device or system, and can store data in any suitable fashion. In some embodiments, the database 350 further includes one or more image models which can be used by the image analysis module 320 for detecting inclement weather conditions based on the images acquired by the IADs 150. For example, a series of image models of various shapes of clouds can be stored in the database 350 and used as part of an image comparison algorithm by the image analysis module 320.

The controller 310 is communicatively coupled to the image analysis module 320 and, when implemented, to the database 350. The controller is configured for obtaining information regarding inclement weather conditions in the flight path of the aircraft 100 from the image analysis module 320. In some embodiments, the controller 310 is configured for performing one or more of the image processing operations discussed hereinabove, in order to detect inclement weather conditions in the flight path of the aircraft 100.

The controller 310 is communicatively coupled to the sensors 145 for acquiring information regarding various performance parameters of the engine 140. This can include information relating to the output power of the engine, speeds of rotation for one or more components of the engine, one or more engine pressures, temperatures, humidity levels, and the like. In addition, the controller 310 is communicatively coupled to the engine 140 for controlling operation thereof, for example by altering operating conditions of the engine 140. This can include adjusting fuel flow to the engine, controlling the position of variable geometry mechanisms (variable inlets, guide vanes, and the like), adjusting fuel-to-air ratios for the engine, altering the position of a bleed-off valve, and any other suitable operating condition of the engine 140.

In some embodiments, the image analysis module 320 can implement one or more artificial intelligence (AI) algorithms for detecting inclement weather conditions based on the images acquired by the IADs 150. The AI can be implemented using any suitable techniques, including machine learning, neural networks, deep learning, and the like. For instance, an AI algorithm can be trained on a dataset of images captured during aircraft flight, some of which contain clouds and others which do not. By training the AI algorithm on the dataset, the AI algorithm can learn to detect the presence of clouds in the flight path of the aircraft, and can thus detect inclement weather conditions. In other embodiments, the engine control system 300 includes a dedicated image processing device in which the image analysis module 320 is embodied, for example a digital signal processing computer chip or similar, to perform the image processing.

In operation, the IADs 150 acquire images of locations within the flight path of the aircraft 100, and the image analysis module 320, which can be a standalone element or be part of the IADs 150 and/or the controller 310, detects inclement weather conditions in the flight path of the aircraft based on the images. When an inclement weather condition is detected, an alert mode for the engine 140 can be triggered. The alert mode can be triggered by the IADs 150, by the image analysis module 320, and/or by the controller 310, as appropriate. The alert mode can signify, for example, that the engine 140 is at increased risk of being exposed to an inclement weather condition, which could trigger a flameout event.

Once in the alert mode, the controller 310 can monitor one or more of the performance parameters of the engine 140, as measured by the sensors 145. This can include monitoring a temperature of one or more portions of the engine 140, monitoring a pressure at one or more locations within the engine 140, a fuel flow to the engine 140, one or more rotor speeds of components within the engine 140, and the like. In some embodiments, the alert mode causes the controller 310 to monitor the performance parameters of the engine 140 at an increased frequency. For instance, the controller 310 can be configured for monitoring a particular temperature of the engine 140 at a rate of 5 times per second (5 Hz) during normal operation. When the alert mode is triggered, the controller 310 increases the frequency of monitoring to a higher rate, for example 25 times per second (25 Hz). If the controller 310 detects a change in one or more of the performance parameters which goes beyond thresholds for those parameters, the controller 310 can then alter one or more operating conditions for the engine 140.

For example, the controller 310 can monitor the temperature of a particular portion of the engine 140 when the engine 140 is in the alert mode. If the temperature drops below a particular threshold, this can indicate to the controller 310 that the engine may be at risk of experiencing a flameout event. In response to the temperature dropping below the threshold, the controller 310 can increase the fuel flow level to the engine 140 to increase the temperature of the engine 140, to attempt to reduce the risk of the flameout event.

In this fashion, the engine control system 300 implements a two-step flameout risk reduction operation. The engine control system 300 first detects the presence of inclement weather conditions in the flight path of the aircraft, and places the engine 140 in an alert mode when inclement weather conditions are detected. Then, when in the alert mode, the engine control system 300 monitors performance parameters of the engine, and when a performance parameter indicates a risk of flameout, the engine control system 300 adjusts the operation of the engine to prevent flameout, or reduce the risk thereof. In some embodiments, if no change in the performance parameters which goes beyond their respective thresholds is detected for a certain amount of time, the alert mode can be withdrawn, i.e. released. The amount of time before release of the alert mode can be any suitable duration, can be altered based on the operating characteristics of the aircraft, for example a speed of the aircraft, and after the period of time has elapsed, the alert mode can be released.

Although the preceding discussion described the alert mode as being triggered in response to a positive detection of inclement weather conditions, other embodiments are also considered. For example, the default state for the engine 140 can be with the alert mode triggered by the engine control system 300 unless no inclement weather condition is detected. Put differently, the engine 140 substantially continuously operates in the alert mode, in which the controller 310 monitors the performance parameters of the engine 140. When the IADs 150 and/or the controller 310 detect no inclement weather conditions in the flight path of the aircraft, the alert mode can be withdrawn.

The engine control system 300, and/or the controller 310, can be implemented in various manners, such as in software on a processor, on a programmable chip, on an Application Specific Integrated Chip (ASIC), or as a hardware circuit. In some embodiments, the controller 310 is implemented in hardware on a dedicated circuit board located inside an Electronic Engine Controller (EEC) or an Engine Control Unit (ECU). The EEC or ECU may be provided as part of a Full Authority Digital Engine Control (FADEC) of an aircraft. In some cases, a processor may be used to communicate information to the circuit, such as high pressure spool speed and/or TLA position. In other embodiments, the controller 310 is implemented in a digital processor. In some embodiments, the FADEC alters the operating condition of the engine when the change in the performance parameters is detected.

In some embodiments, the image analysis module 320 is a substantially standalone component of the engine control system 300 which interfaces with the IADs 150 and the controller 310. The image analysis module 320 receives the images from the IADs 150, performs one or more image processing operations, then provides an indication of inclement weather to the controller 310. The indications provided to the controller 310 can include a position of the inclement weather condition, a distance until the inclement weather condition is reached, a time-to-reach the inclement weather condition, a scale, size, shape, etc., of the inclement weather condition, and the like. In some other embodiments, part or all of the functionality of the image analysis module 320 is combined with the IADs 150 and/or with the controller 310. For example, the image analysis functionality can be combined with the IADs 150, or with the controller 310. Similarly, the alert raising functionality can be combined with the IADs 150, or with the controller 310. Still other possibilities are considered.

Figure 4:
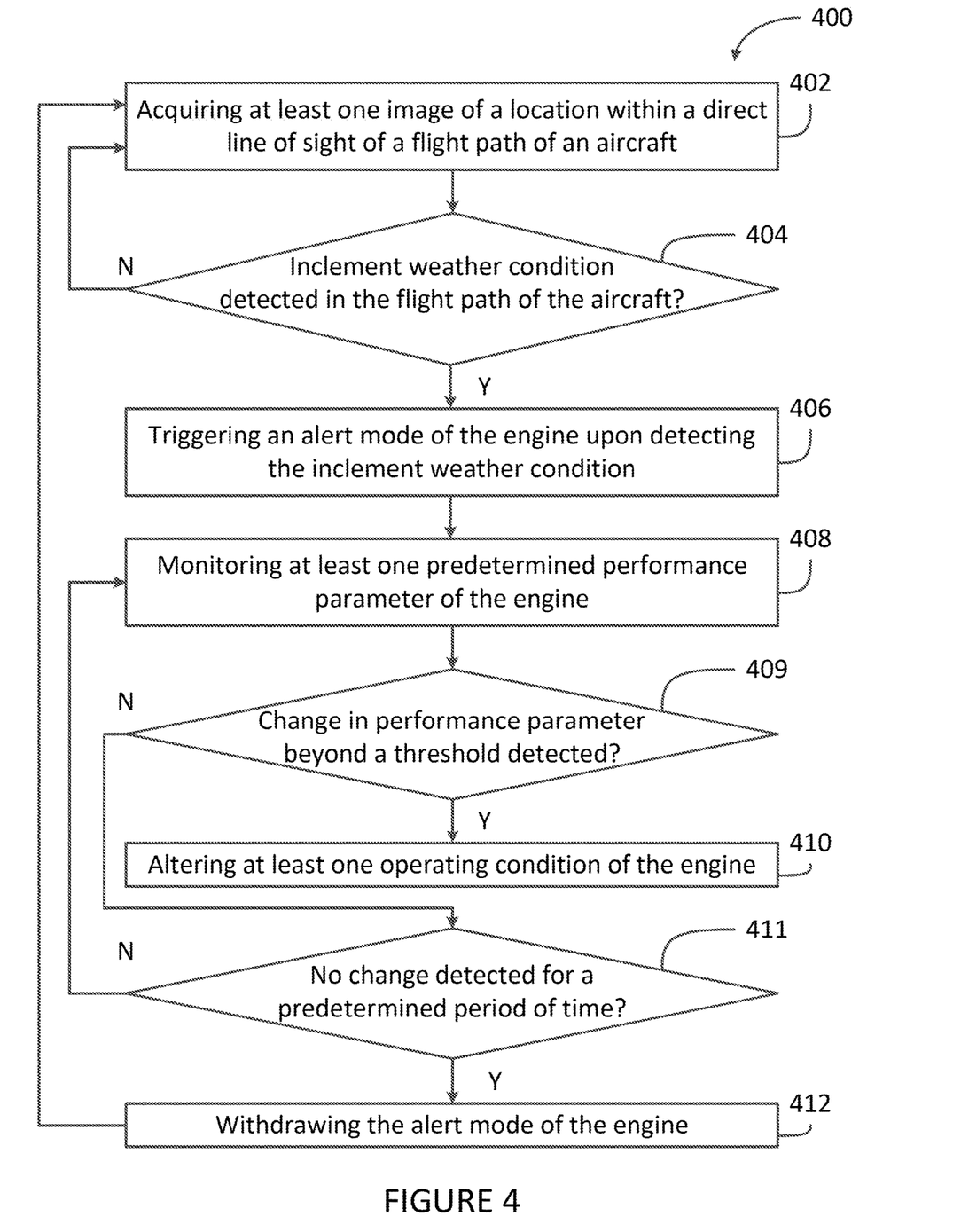
FIG. 4 is a flowchart of an example method for operating an engine of an aircraft in inclement weather.

With reference to FIG. 4, the engine control system 300 can be configured for implementing a method 400 for operating an aircraft engine during inclement weather, for example the engine 140. At step 402, one or more images of a location substantially in line with the flight path of the aircraft 100 are acquired, for example via the IADs 150. The location can be substantially directly in line with or aligned with the flight path of the aircraft, can be offset or angled with respect to the flight path, or along any other suitable heading with respect to the flight path of the aircraft 100. At decision step 404, a determination is made regarding whether an inclement weather condition is detected in the flight path of the aircraft 100 based on the images. If an inclement weather condition is detected, the method 400 moves to 406. If no inclement weather condition is detected, the method 400 returns to step 402. At step 406, upon detecting the inclement weather condition, an alert mode for the engine 140 is triggered. At step 408, one or more predetermined performance parameters for the engine 140 are monitored.

At decision step 409, an evaluation is made regarding whether any of the performance parameters has changed to a degree beyond a threshold. If a change in one of the performance parameters going beyond the threshold has been detected, the method 400 moves to step 410. At step 410, one or more operating conditions of the engine 140 can be altered, for example via the controller 310.

If no change in one of the performance parameters going beyond the threshold has been detected, the method 400 moves to step 411. At step 411, a determination can be made regarding whether any change beyond the threshold has occurred during a certain period of time. For instance, the alert mode, when triggered at step 206, can be valid for a few seconds, a few minutes, a few hours, or any other period of time. If this period of time has not yet elapsed, the method 400 can return to some previous step, for example step 408, to continue to monitor the performance parameters for the duration of the time period. If no such change is detected for during the duration of the period of time, the alert mode for the engine 140 can be withdrawn, as per step 412, and the method can return to another previous step, for example step 402.

It should be noted that the time delay between acquiring the images at step 402, detecting the inclement weather at step 404, triggering the alert mode at step 406, and monitoring predetermined performance parameters at step 408 may be of the order of 1 millisecond or less, depending on the capabilities of the engine control system 300. In some embodiments, the transition from step 404 to step 406 occurs over one clock cycle in the engine computer, and step 206 begins immediately once the alert mode is triggered. Other time delays may be used.

In some embodiments, the predetermined performance parameters correspond to thrust lever angle (TLA) position, fuel flow ($W_1$), high pressure spool speed ($N_2$), and compressor outlet pressure ($P_3$). In some embodiments, monitoring the predetermined performance parameters includes monitoring particular combinations of performance parameters. For example, if the TLA is fixed, $W_f/P_3$ increases, and $N_2$ changes beyond the threshold for $N_2$, this can indicate to the controller 310 that an operating condition of the engine 140 must be altered. Other embodiments may include different locations for the pressure measurement, such as upstream at a compressor inlet ($P_2$) or downstream at a turbine outlet ($P_5$). Similarly, $P_3$ may be deduced or calculated using other pressure measurements, such as $P_2$, $P_5$, and the like.

The compressor discharge pressure $P_3$ may be replaced by a pair of temperatures, i.e. a temperature reading at a first location and a temperature reading at a second location, downstream from the first location. In some embodiments, the first location corresponds to the compressor inlet 20 (referred to as $T_2$) and the second location corresponds to a compressor outlet 22 (referred to as $T_3$). In this case, the inclement weather condition is satisfied when the TLA is fixed, $W_f$ increases, $T_3/T_2$ decreases, and $N_2$ changes. In other embodiments, the first location corresponds to $T_2$ and the second location corresponds to the turbine outlet 24 (referred to as $T_5$). In this case, the inclement weather condition is satisfied when the TLA is fixed, $W_f$ increases, $T_5/T_2$ decreases, and $N_2$ changes. Other locations for the temperature readings may be used. In addition, $T_2$, $T_3$, and/or $T_5$ may be deduced and/or calculated using temperature measurements form other locations. Other predetermined performance parameters may be used, such as the total or static pressure at the output of a high pressure compressor (P28 or S28).

Figure 5:
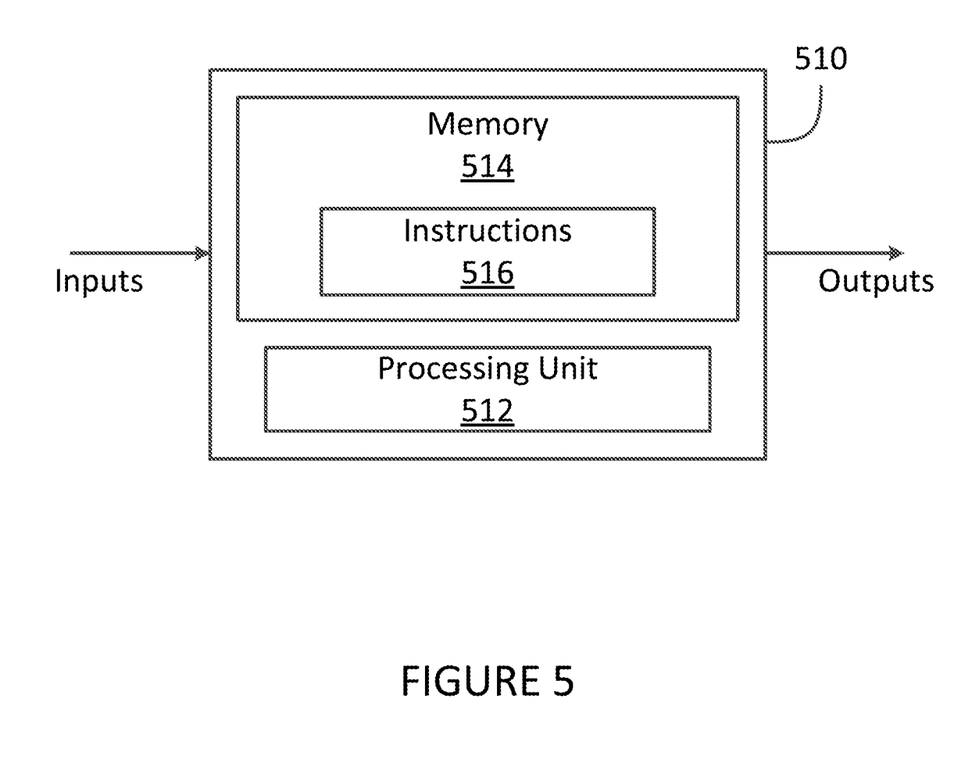
FIG. 5 is block diagram of an example computing device for implementing the method of FIG. 4.

With reference to FIG. 5, engine control system 300, and/or the controller 310 may be embodied by a computing device 510 configured for implementing the method 400. The computing device 510 comprises a processing unit 512 and a memory 514 which has stored therein computer-executable instructions 516. The processing unit 512 may comprise any suitable devices configured to implement the method 400 such that instructions 516, when executed by the computing device 510 or other programmable apparatus, may cause the functions/acts/steps performed as part of the method 400 as described herein to be executed. The processing unit 512 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 514 may comprise any suitable known or other machine-readable storage medium. The memory 514 may comprise non-transitory computer readable storage medium, for example, but not limited to, an electronic, magnetic, optical, electromagnetic, infrared, or semiconductor system, apparatus, or device, or any suitable combination of the foregoing. The memory 514 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 514 may comprise any storage means (e.g., devices) suitable for retrievably storing machine-readable instructions 516 executable by processing unit 512.

It should be noted that the computing device 510 may be implemented as part of a FADEC or other similar device, including electronic engine control (EEC), engine control unit (EUC), and the like. In addition, it should be noted that the method 400 and, more generally, the techniques described herein can be performed substantially in real-time, during operation of the engines 140, for example during a flight mission.

The systems and methods described herein may be implemented in a high level procedural or object oriented programming or scripting language, or a combination thereof, to communicate with or assist in the operation of a computer system, for example the computing device 510. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 512 of the computing device 510, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A system for operating an engine of an aircraft in inclement weather, the system comprising:
    an image-acquisition device affixed to the aircraft having a line-of-sight substantially aligned with a heading of the aircraft, the image-acquisition device configured for acquiring at least one image of a location aligned with the heading;
    an image analysis module communicatively coupled to the image-acquisition device and configured for:
        detecting, based on the at least one image, a presence of a cloud in the location, the cloud being indicative of moisture at the location; and
        triggering an alert mode of the engine upon detecting the presence of the cloud; and
    an engine controller communicatively coupled to the image analysis module and to the engine, the engine controller configured for:
        responsive to the alert mode being triggered, monitoring an operating temperature of the engine; and
        upon detecting a decrease in the operating temperature of the engine below a predetermined temperature threshold, altering at least one operating condition of the engine.

2. The system of claim 1, wherein the image analysis module is further configured for releasing the alert mode when no change in the operating temperature of the engine is detected for a predetermined time period.

3. The system of claim 1, wherein the presence of the cloud is detected using a machine learning algorithm.

4. The system of claim 1, wherein the image-acquisition device is an infrared camera.

5. The system of claim 1, wherein the image-acquisition device is a visible-light camera.

6. The system of claim 1, wherein the image-acquisition device is a radar system.

7. The system of claim 1, wherein the image-acquisition device is configured for acquiring the at least one image of a location ahead of the engine.

8. A method for operating an aircraft engine during inclement weather, comprising:
    acquiring at least one image of a location substantially in line with a heading of the aircraft;
    detecting, based on the at least one image, a presence of a cloud in the location, the cloud being indicative of moisture at the location;
    triggering an alert mode of the engine upon detecting the presence of the cloud;
    responsive to the alert mode being triggered, monitoring an operating temperature of the engine; and
    upon detecting a decrease in the operating temperature of the engine below a predetermined temperature threshold, altering at least one operating condition of the engine.

9. The method of claim 8, further comprising releasing the alert mode when no change in the operating temperature of the engine is detected for a predetermined time period.

10. The system of claim 8, wherein the presence of the cloud is detected using a machine learning algorithm.

11. The system of claim 8, wherein the at least one image is acquired with an infrared camera.

12. The system of claim 8, wherein the at least one image is acquired with a visible-light camera.

13. The system of claim 8, wherein the at least one image is acquired with a radar system.

14. The system of claim 8, wherein the acquiring of the at least one image of the location substantially in line with the heading of the aircraft comprises acquiring the at least one image of a location ahead of the engine.

* * * * *